United States Patent
Laroche

(10) Patent No.: US 10,449,483 B2
(45) Date of Patent: Oct. 22, 2019

(54) GAS SWEETENING SOLVENTS CONTAINING QUATERNARY AMMONIUM SALTS

(71) Applicant: Dow Global Technologies LLC, Midland, MI (US)

(72) Inventor: Christophe R. Laroche, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 550 days.

(21) Appl. No.: 14/914,979

(22) PCT Filed: Aug. 27, 2014

(86) PCT No.: PCT/US2014/052915
§ 371 (c)(1),
(2) Date: Feb. 26, 2016

(87) PCT Pub. No.: WO2015/031484
PCT Pub. Date: Mar. 5, 2015

(65) Prior Publication Data
US 2016/0206992 A1     Jul. 21, 2016

Related U.S. Application Data

(60) Provisional application No. 61/871,433, filed on Aug. 29, 2013.

(51) Int. Cl.
*B01D 47/00*     (2006.01)
*B01D 53/14*     (2006.01)

(52) U.S. Cl.
CPC ..... *B01D 53/1493* (2013.01); *B01D 53/1468* (2013.01); *B01D 53/1462* (2013.01);
(Continued)

(58) Field of Classification Search
None
See application file for complete search history.

(56) References Cited

U.S. PATENT DOCUMENTS 4,343,747 A * 8/1982 Ryu ............... C07F 11/005
556/1
4,889,700 A * 12/1989 Elgue ............ B01D 53/1468
423/220

(Continued)

FOREIGN PATENT DOCUMENTS

CN     101829492 A     9/2010
CN     102232004 A     11/2011

(Continued)

OTHER PUBLICATIONS

Ethanolamines and Propanolamines; Matthias Frauenkron; Ullmann's ENcyclopedia or Industrial Chemistry https://onlinelibrary.wiley.conn/doi/full/10.1002/14356007.a10_001, accessed Nov. 9, 2018 (Year: 2001).*

(Continued)

*Primary Examiner* — Amber R Orlando
*Assistant Examiner* — Phillip Y Shao
(74) *Attorney, Agent, or Firm* — Akerman LLP

(57) ABSTRACT

A method of treating oil and gas streams comprising $H_2S$ and a carbon oxide, the method including the step of treating the oil and gas stream with an amine solution having an alkanolamine and a quaternary ammonium salt, wherein the amine solution selectively removes the $H_2S$ over the carbon oxide.

9 Claims, 2 Drawing Sheets

(52) U.S. Cl.
CPC ............ *B01D 2252/2053* (2013.01); *B01D 2252/20431* (2013.01); *B01D 2252/20484* (2013.01); *B01D 2252/20489* (2013.01); *B01D 2252/504* (2013.01); *B01D 2256/24* (2013.01); *B01D 2258/0283* (2013.01)

(56) References Cited

U.S. PATENT DOCUMENTS

| | | | |
|---|---|---|---|
| 5,393,505 | A | 2/1995 | Audeh |
| 5,744,024 | A | 4/1998 | Sullivan et al. |
| 8,178,332 | B2 | 5/2012 | Gellett et al. |
| 8,476,475 | B2 | 7/2013 | Asprion |
| 2009/0220399 | A1 | 9/2009 | Wang et al. |
| 2011/0155646 | A1* | 6/2011 | Karas ............ C10G 29/20 208/187 |
| 2011/0262330 | A1 | 10/2011 | Hall et al. |

FOREIGN PATENT DOCUMENTS

| | | | |
|---|---|---|---|
| CN | 103 159 632 | 6/2013 | |
| DE | 10 2008 013738 | 9/2009 | |
| EP | 0224348 | 6/1987 | |
| EP | 0224348 A2 * | 6/1987 | ......... B01D 53/1493 |
| JP | 2000-165185 A | 9/2000 | |
| RU | 2418618 | 5/2011 | |
| WO | 2012/158609 | 11/2012 | |

OTHER PUBLICATIONS

International Search Report issued by the EPO for International Appln No. PCT/US2014/052915 (dated Nov. 24, 2014).

International Preliminary Report on Patentability issued by the US for International Appln No. PCT/US2014/052915 (dated Jun. 18, 2015).

* cited by examiner

GAS SWEETENING SOLVENTS CONTAINING QUATERNARY AMMONIUM SALTS

CROSS-REFERENCE TO RELATED APPLICATIONS

This application is a national phase of PCT/US2014/052915, filed Aug. 27, 2014, which claims priority to U.S. Provisional Application No. 61/871,433, filed Aug. 29, 2013, the entire contents of both are hereby incorporated by reference.

FIELD OF THE INVENTION

The invention relates generally to quaternary ammonium compounds. More specifically, the invention relates to aqueous alkanolamine solutions and the use of quaternary ammonium compounds within those solutions to increase the amine concentration and efficacy of the solutions.

BACKGROUND OF THE INVENTION

Streams derived from natural gas reservoirs, petroleum or coal, often contain a significant amount of acid gases, for example carbon oxides such as carbon monoxide (CO) and carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), or mercaptans as impurities. These fluid streams may be gas, liquid, or mixtures thereof, for example gases such as natural gas, refinery gas, hydrocarbon gasses from shale pyrolysis, synthesis gas, and the like or liquids such as liquefied petroleum gas (LPG) and natural gas liquids (NGL).

Various compositions and processes for the removal of acid gasses are known and described in the literature. It is well-known to treat gaseous mixtures with aqueous amine solutions to remove these acidic gases. Typically, the aqueous amine solution contacts the gaseous mixture, comprising the acidic gases, counter currently at low temperature or high pressure in an absorber tower. The aqueous amine solution commonly contains an alkanolamine such as triethanolamine (TEA), methyldiethanolamine (MDEA), diethanolamine (DEA), monoethanolamine (MEA), diisopropanolamine (DIPA), or 2-(2-aminoethoxy) ethanol (sometimes referred to as diglycolamine or DGA).

For example, U.S. Pat. No. 4,336,233 discloses the use of a mixture of piperazine and MDEA for the simultaneous removal of $CO_2$ and $H_2S$ from gas streams. Piperazine undergoes a rapid reaction with $CO_2$ to form a carbamate whereas MDEA reacts slowly with $CO_2$ because its tertiary alkanolamine structure prevents the formation of a carbamate.

Tertiary alkanolamines, for example MDEA, are often used in combination with an activator such as Piperazine as disclosed in U.S. Pat. No. 4,336,233; U.S. Pat. No. 4,997,630; and U.S. Pat. No. 6,337,059, all of which are incorporated by reference herein in their entirety. Alternatively, DE 1,904,428 discloses the use of a mixture of methylaminoethanol (MMEA, MAE or NMEA) and MDEA for the removal of $CO_2$ and $H_2S$ from gas streams and DE 1,474,218 discloses the use of a mixture of diethanolamine (DEA) and MDEA for the removal of $CO_2$ and $H_2S$ from gas streams. Thus, MMEA and DEA are known activators of MDEA.

It is often desirable to selectivity remove $H_2S$ from gas streams containing both $H_2S$ and $CO_2$ thus minimizing the removal of $CO_2$. Solutions of primary and secondary alkanolamine such as MEA, DEA or DGA absorb $H_2S$ and $CO_2$ simultaneously removing both acidic gases. United States pipeline specifications for natural gas allow for the stream to contain up to 2 mol % of $CO_2$ meanwhile allowing for up to 4 ppm $H_2S$. Therefore, it could be desirable for natural gas streams containing less than 2 mol % $CO_2$ and more than 4 ppm $H_2S$ to be purified with a process minimizing the removal of $CO_2$.

| Component | U.S. Pipeline Specification |
|---|---|
| $CO_2$ | <2 mol % |
| $H_2S$ | <4 ppm |
| $H_2O$ | <120 ppm |
| C3+ | 950-1050 Btu/scf dew point −20° C. |
| Total Inerts ($N_2$, He etc) | <4 mol % |

Examples of gas sweetening processes include U.S. Pat. No. 4,471,138 which discloses the use of severely sterically hindered alkanolamines for the selective removal of $H_2S$ over $CO_2$. The amines of the invention are perceived to maintain their selectivity for $H_2S$ even at high loading of $H_2S$, at high temperature and at low pressure. The commercial usefulness of severely sterically hindered alkanolamine is somewhat limited by their difficult preparation as exemplified by patent publication WO 2005/081778 A2.

GB Patent 2,017,524 discloses the use of tertiary alkanolamine for the selective removal of $H_2S$ over $CO_2$. The amines of the invention are perceived to possess high selectivity for $H_2S$ in combination with high $H_2S$ loading capacity. The selectivity for $H_2S$ of tertiary alkanolamines such as methyldiethanolamine (MDEA) has been disclosed as early as 1950 by *Frazier and Kohl, Ind. And Eng. Chem.*, 42, 2288 (1950). The selectivity is attributed to a slow rate of reaction of tertiary alkanolamine with $CO_2$ compared to $H_2S$.

In 1997, Chakma, in the *The Canadian Journal of Chemical Engineering*, 75, 1997, teaches that the thermal degradation of MDEA leads to the formation of dimethylethanolamine (DMEA) and diethanolamine (DEA). DMEA degrades further to methylaminoethanol (MMEA, MAE or NMEA). Therefore, the thermal degradation of MDEA produces compounds such as MMEA and DEA which are known activators of tertiary alkanolamine such as MDEA towards the removal of $CO_2$. Thus, it is expected that the degree of selectivity of MDEA for $H_2S$ over $CO_2$ will decrease overtime as MDEA thermally degrades to MMEA and DEA.

In 2009 and 2010, Carrette and Al. in *Energy Procedia* 1 2009, 893-900, *Ind. Eng. Chem. Res.* 2009, 48, 9061-9067 and *Ind. Eng. Chem. Res.* 2010, 49, 7147-7151 teach that the degradation pathway of MDEA reported by Chakma can be extended to other alkanolamines. These publications also teach that alkanolamine degradation rates are enhanced in the presence of oxygen and that most degradation products are the same in the presence or in the absence of oxygen.

Gas purification processes are widely encountered in refineries. Aqueous alkanolamine solutions are commonly used for this purpose. Among them industry standards evolve from monoethanolamine (MEA) to diethanolamine (DEA). Presently, refiners are converting their DEA processes for more energy efficient methyldiethanolamine (MDEA) processes. Part of the energy improvement comes from the ability of MDEA to remove selectively $H_2S$ over $CO_2$ compared to DEA. The most preferred strategy in order to perform the conversion from DEA to MDEA is to keep replenishing the solvent sump with MDEA until extinction of DEA. Shutting down refineries to undertake this task is costly and also builds inefficiency. Therefore, there is a transition period during which the refinery will operate with a solution containing mixture of DEA and MDEA and for which a poor selectivity for $H_2S$ over $CO_2$ will be observed.

Therefore, there is a need for a process capable of maintaining the degree of selective removal of $H_2S$ over $CO_2$ when using tertiary alkanolamine after the alkanolamine is partially or substantially degraded. There is also a need for a process capable of increasing the rate of conversion of a solution containing a mixture of an activator such as DEA and a tertiary alkanolamine such as MDEA to a tertiary alkanolamine solution containing no activator thus exhibiting a high degree of selective removal of $H_2S$ over $CO_2$.

SUMMARY OF THE INVENTION

In accordance with the invention, there is provided a method of treating oil and gas streams comprising acidic gas constituents and preferably at least hydrogen sulfide ($H_2S$). Preferably the method of the invention comprises removing $H_2S$ selectively from a gaseous mixture comprising $H_2S$ and carbon dioxide ($CO_2$). The method comprises the step of treating the gas stream with an amine solution having an alkanolamine and a quaternary ammonium salt, wherein the amine solution selectively removes hydrogen sulfide over other acidic gas species.

The invention relates to gas sweetening applications where selective $H_2S$ removal over $CO_2$ is desired. Aqueous solutions of tertiary amines such as methyldiethanolamine (MDEA), triethanolamine (TEA) or dimethylaminopropanediol (DMAPD) proved to be a solution of choice for $H_2S$ selective processes. Tertiary amines display fast reaction rate with $H_2S$ along with slow reaction rate with $CO_2$.

It is known in the art that aqueous solution made of tertiary amine with an activator such as piperazine are extremely efficient at removing both $H_2S$ and $CO_2$. However, this process is non selective. Piperazine displays very fast kinetic rate with $CO_2$ which explains why the aqueous mixtures of MDEA and Piperazine display high reaction rate with $CO_2$.

Predictably, it may take years for the concentration of activator to diminish to a level where it has negligible impact. Therefore, it has been observed that a significant amount of activator remains in the system at refineries that convert from DEA to MDEA even years after they started the process. The amount of DEA significantly impacts the performance of MDEA solvent by increasing the kinetic rate of $CO_2$ absorption, again resulting in a non selective process.

The invention solves these problems through the addition of a methylated quaternary ammonium salts. Methylated quaternary ammonium salts transfer their methyl group to known activator such as MAE or DEA following the chemical reaction described below:

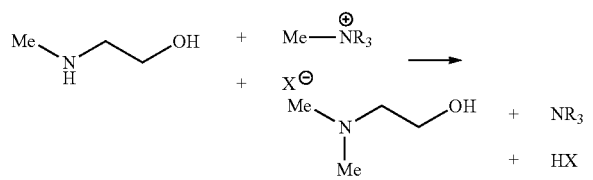

The reaction between a secondary amine (MAE) and a methylated quaternary ammonium salt produces dimethylaminoethanol (DMEA), the tertiary amine resulting from the demethylation of the quaternary ammonium salt ($NR_3$) and the conjugated acid of the quaternary ammonium salt counter anion (HX).

DETAILED DESCRIPTION OF THE INVENTION

Figure 1:
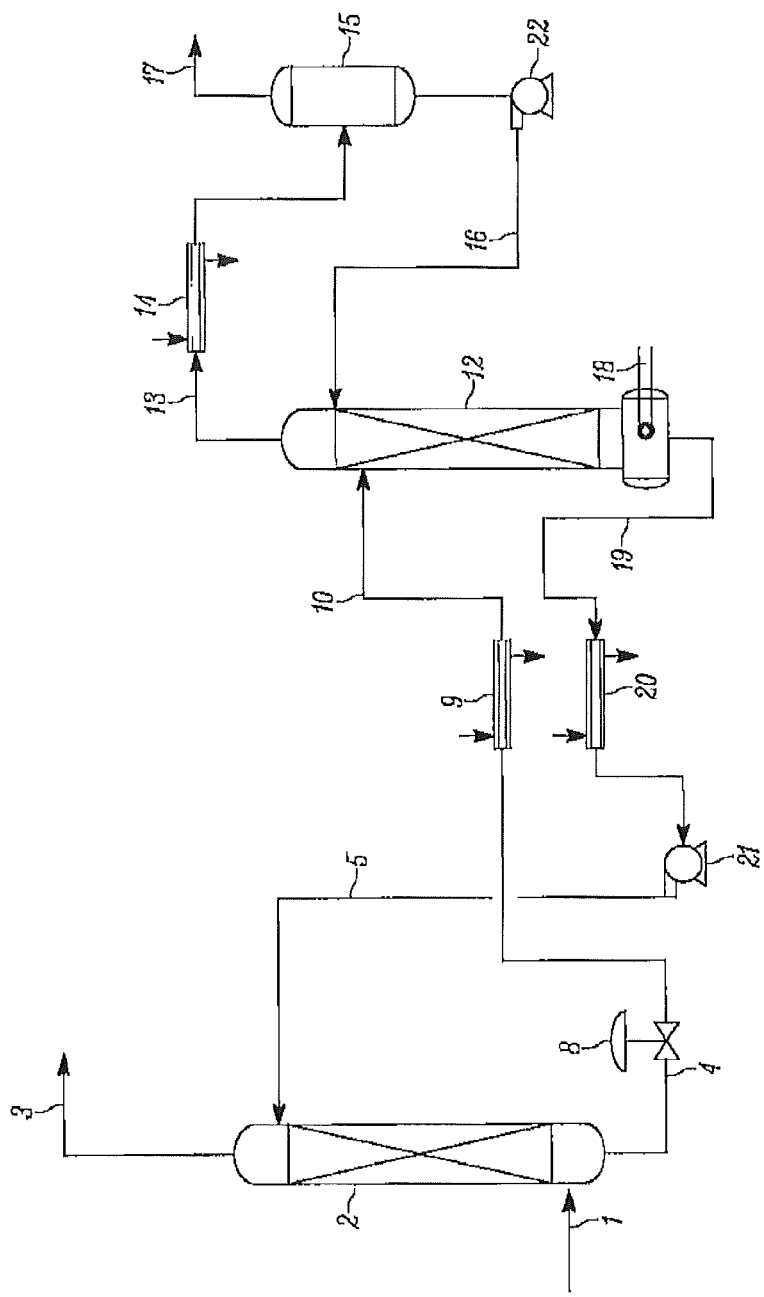
FIG. 1 is a schematic depiction of an exemplary gas treating process and apparatus.

The invention is a method for selectively reserving acidic constituents such as sulfur based compounds like $H_2S$ from liquid and gaseous streams in favor of carbon based gaseous constituents such as CO and $CO_2$. In one embodiment, the method of the invention comprises a method of treating a gaseous stream with an amine solution comprising an alkanolamine and a quaternary ammonium salt. The quaternary ammonium salt may be added to the initial amine solution or, alternatively added during processing of the liquid or gaseous stream.

Quaternary ammonium compounds useful in the invention include those of the formula:

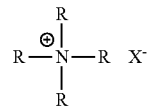

wherein at least one of $R_1$, $R_2$, $R_3$ or $R_4$ is methyl; and each of $R_1$, $R_2$, $R_3$ or $R_4$ is each independently aromatic, saturated or unsaturated cyclic, linear or branched alkyl, hydroxyl alkyls, alkyl halides, symmetrical and non-symmetrical alkyl ethers, alkyl aldehydes, symmetrical and non-symmetrical alkyl ketones, dicarbonyls, carbohydrates, carboxylic acids and derivatives thereof, aliphatic nitrates, nitro alkanes, aliphatic amines, and aliphatic sulfur moieties.

Further $X^-$ may be an anion such as $Cl^-$, $F^-$, $Br^-$, $I^-$, $HCO_3^-$, $CO_3^{2-}$, $RCO_2^-$, $RPO_4^{2-}$, $R_2PO_4^-$, $PO_4^{3-}$, $RSO_4^-$, $SO_4^{2-}$ and $RSO_3^-$ and mixtures thereof.

More specifically $R_1$, $R_2$, $R_3$ or $R_4$ may each independently be an aromatic moiety including aromatic hydrocarbons, aromatic nitro compounds, aromatic halogen compounds, sulfuric acids and derivatives thereof, aromatic amines and substitution products thereof, aryl hydrazines and ureas, phenyls and phenylethers, aromatic aldehydes, aromatic ketones and quinones, aromatic carboxylic acids and derivatives thereof, and aromatic nitrites, among others.

Further aliphatic groups are also relevant. At least one of $R_1$, $R_2$, $R_3$ or $R_4$ is methyl. Preferably at least two of $R_1$, $R_2$, $R_3$ and $R_4$ are methyl. $R_1$, $R_2$, $R_3$ or $R_4$ may also be a cyclic $C_{4-12}$ aliphatic moieties.

$R_1$, $R_2$, $R_3$ and $R_4$ may also be a linear or branched alkyl of $C_2$ to $C_{24}$ in length which has been functionalized with a hydroxyl or other groups. Preferably, the alkyl is $C_2$-$C_6$ in length, linear or branched, saturated or unsaturated.

$R_1$, $R_2$, $R_3$ and $R_4$ may also be a linear or branched, saturated or unsaturated alkyl of $C_2$ to $C_{24}$ in length. Preferably, at least one of the alkyl comprises a monofunctional or difunctional alcohol moiety. Preferably, hydroxyalkyls are linear or branched mono or di-functional alcohol moieties such as $C_1$-$C_6$ hydroxyl moieties. The hydroxyl moiety may also be saturated or unsaturated such as a vinylic, allylic, or homo allylic alcohols.

$R_1$, $R_2$, $R_3$ and $R_4$ may be also each independently a symmetrical or unsymmetrical alkyl ether. Generally, the oxygen pendent aliphatic groups may be saturated or unsaturated, linear or branched ranging in length from $C_1$-$C_6$.

$R_1$, $R_2$, $R_3$ and $R_4$ may each independently be a $C_1$-$C_6$ linear or branched alkyl halide, the halogen preferably being Cl, F, Br, I or mixtures thereof.

$R_1$, $R_2$, $R_3$ and $R_4$ may also each independently be an aliphatic ketone moiety with a branched or linear, saturated or unsaturated alkyl chain. Generally the aliphatic alkyl chain may be $C_2$-$C_8$ in length which are either symmetrical or unsymmetrical in orientation. Mono-functional and di-functional ketones are useful moieties in accordance with the invention.

$R_1$, $R_2$, $R_3$ and $R_4$ may also each independently be an alkyl aldehyde moiety, an alkyl halide moiety, a carboxylic acid or derivative thereof, a dicarbonyl moiety, a carbohydrate moiety, an amine compound such as an aliphatic nitrite, a nitroalkane, or an aliphatic amine compound, or an aliphatic sulfur compound, among others.

Preferred quaternary ammonium salts include 2-hydroxy-N-(2-hydroxyethyl)-N,N-dimethylethanaminium bromide; 2-hydroxy-N-(2-hydroxyethyl)-N,N-dimethylethanaminium chloride; 2-hydroxy-N-(2-hydroxyethyl)-N,N-dimethylethanaminium iodide; 2-hydroxy-N-(2-hydroxyethyl)-N,N-dimethylethanaminium bicarbonate; 2-hydroxy-N-(2-hydroxyethyl)-N,N-dimethylethanaminium carbonate; 2-hydroxy-N-(2-hydroxyethyl)-N,N-dimethylethanaminium sulfate; 2-hydroxy-N-(2-hydroxyethyl)-N,N-dimethylethanaminium phosphate; 2,3-dihydroxy-N,N,N-trimethylpropan-1-aminium chloride; 2,3-dihydroxy-N,N,N-trimethylpropan-1-aminium bromide; 2,3-dihydroxy-N,N,N-trimethylpropan-1-aminium iodide; 2,3-dihydroxy-N,N,N-trimethylpropan-1-aminium bicarbonate; 2,3-dihydroxy-N,N,N-trimethylpropan-1-aminium carbonate; 2,3-dihydroxy-N,N,N-trimethylpropan-1-aminium sulfate; 2,3-dihydroxy-N,N,N-trimethylpropan-1-aminium phosphate; 2-hydroxy-N,N-bis(2-hydroxyethyl)-N-methy ethanaminium bromide; 2-hydroxy-N,N-bis(2-hydroxyethyl)-N-methy ethanaminium chloride; 2-hydroxy-N,N-bis(2-hydroxyethyl)-N-methy ethanaminium iodide; 2-hydroxy-N,N-bis(2-hydroxyethyl)-N-methy ethanaminium bicarbonate; 2-hydroxy-N,N-bis(2-hydroxyethyl)-N-methy ethanaminium carbonate; 2-hydroxy-N,N-bis(2-hydroxyethyl)-N-methy ethanaminium sulfate; 2-hydroxy-N,N-bis(2-hydroxyethyl)-N-methy ethanaminium phosphate; tetramethyl ammonium bromide; tetramethyl ammonium chloride; tetramethyl ammonium iodide; tetramethyl ammonium bicarbonate; tetramethyl ammonium carbonate; tetramethyl ammonium sulfate; tetramethyl ammonium phosphate; and mixtures thereof.

The invention is applicable to any number of alkanolamine solutions which are selective to the removal of acidic gaseous species such as $H_2S$ over or in the presence of $CO_2$. In its preferred mode, the process of the invention will remove those acidic species over $CO_2$. The quaternary ammonium salts may be added to the alkanolamine solution prior to processing or during processing. The composition and method of the invention is also effective in removing other acidic species such as $CS_2$, $SO_2$, HCN, COS, mercaptans as well as other impurities.

Generally, alkanolamine solutions useful in the invention are those which comprise primary, secondary, or tertiary depending on the number of non-hydrogen substituents bonded to the nitrogen atom of the amino group. Monoethanolamine ($HOCH_2CH_2NH_2$) is an example of a well-known primary alkanolamine. Secondary alkanolamines include diethanolamine (($HOCH_2CH_2)_2NH$) and diisopropanolamine (($CH_3CHOHCH_3)_2NH$). Methyldiethanolamine (($HOCH_2CH_2)_2NMe$) and triethanolamine (($HOCH_2CH_2)_3N$) are examples of tertiary alkanolamines which have been used to absorb hydrogen sulfide from industrial gas mixtures.

Generally, the quaternary ammonium salt may be intermixed with the alkanolamine solution prior to application to the refinery process. The quaternary ammonium salt may also be introduced into the alkanolamine solution in process. Representative concentrations are:

TABLE 1

| | (wt %) | | |
|---|---|---|---|
| | Useful | Preferable | More Preferable |
| Concentration Guidelines: Initial Solutions. | | | |
| Quaternary Ammonium Salt | 0.1-5 | 0.2-2.5 | 0.5-2 |
| Alkanolamine | 5-99 | 10-60 | 15-50 |
| Solution | Balance | Balance | Balance |
| Concentration Guidelines: During Processing. | | | |
| Quaternary Ammonium Salt | 0.5-99 | 5-60 | 10-50 |
| Alkanolamine | 0.01-60 | 1-50 | 2-25 |
| Solution | Balance | Balance | Balance |

Compositions used in the invention may also comprise corrosion inhibitors, antifoaming agents and stripping aids, and mixtures thereof.

Any number of corrosion inhibitors may be used in the methods and compositions of the invention which are consistent with the environment of use.

Here again, the composition of the invention may comprise antifoaming agents consistent with the environment of use. Exemplary antifoaming agents used in the oil and gas industry include silicone based defoamers and EO/PO based defoamers such as polysiloxane, and polypropylene glycol copolymers among others at a concentration of about 10 ppm to 200 ppm.

The composition of the invention may also comprise stripping aids such as mineral acids including phosphoric acid, sulfuric acid, boric acid and mixtures thereof at a concentration of about 0.1 wt-% to 10 wt-%.

The invention set forth herein has great application in the petrochemical and energy industries. For example, the invention can be used for the treatment of fluid streams, gas, liquid, or mixtures, in an oil refinery, the treatment of sour gas, the treatment of coal steam gas, the treatment of hazardous stack emissions, the treatment of land field gasses, and a new series of devices dealing with hazardous emissions for human safety.

The fluid streams to be treated by the process of the present invention contain an acid gas mixture which includes $H_2S$, and may include other gases such as $CO_2$, $N_2$, $CH_4$, $C_2H_6$, $C_3H_8$, $H_2$, CO, $H_2O$, COS, HCN, $NH_3$, $O_2$, mercaptans, and the like. Often such gas mixtures are found in combustion gases, refinery gases, town gas, natural gas, syn gas, tail gas, water gas, propane, propylene, heavy hydrocarbon gases, etc. The aqueous alkanolamine solution herein is particularly effective when the fluid stream is a gaseous mixture, obtained, for example, from shale oil retort gas, coal or gasification of heavy oil with air/steam or oxygen/steam thermal conversion of heavy residual oil to lower molecular weight liquids and gases, or in sulfur plant tail gas clean-up operations.

The process of the present invention is preferably used to selectively remove $H_2S$ over $CO_2$ from a gas stream comprising $H_2S$ and $CO_2$ optionally in the presence of one or more other acid gas impurities, for example $N_2$, $CH_4$, $C_2H_6$, $C_3H_8$, $H_2$, CO, $H_2O$, COS, HCN, $NH_3$, $O_2$, and/or mercaptans. Further, the present invention may be used to remove $H_2S$, $CO_2$ and one or more of $N_2$, $CH_4$, $C_2H_6$, $C_3H_8$, $H_2$, CO, $H_2O$, COS, HCN, $NH_3$, $O_2$, and/or mercaptans from a gas stream comprising $H_2S$, $CO_2$ and one or more of $SO_2$, $CS_2$, HCN, COS, and/or mercaptans.

The absorption step of this invention generally involves contacting the fluid stream, preferably gaseous mixture, with the aqueous alkanolamine solution in any suitable contacting vessel, for examples of representative absorption processes see U.S. Pat. Nos. 5,736,115 and 6,337,059, both of which are incorporated herein by reference in their entirety. In such processes, the fluid stream containing $H_2S$ and/or other impurities from which the acid gasses are to be removed may be brought into intimate contact with the aqueous alkanolamine solution using conventional means, such as a tower or vessel packed with, for example, rings or with sieve plates, or a bubble reactor.

In a typical mode of practicing the invention, the absorption step is conducted by feeding the fluid stream into the lower portion of the absorption tower while fresh aqueous alkanolamine solution is fed into the upper region of the tower. The fluid stream, freed largely from the $H_2S$ and $CO_2$ if present emerges from the upper portion (sometimes referred to as treated or cleaned gas) of the tower, and the loaded aqueous alkanolamine solution, which contains the absorbed $H_2S$ and $CO_2$, leaves the tower near or at its bottom. Preferably, the inlet temperature of the absorbent composition during the absorption step is in the range of from 50° F. to 210° F., and more preferably from 80° F. to 160° F. Pressures may vary widely; acceptable pressures are between 5 and 2,000 pounds per square inch (psi), preferably 20 to 1,500 psi, and most preferably 25 to 1,000 psi in the absorber. The contacting takes place under conditions such that the $H_2S$ is preferably absorbed by the solution. The absorption conditions and apparatus are designed so as to minimize the residence time of the aqueous alkanolamine solution in the absorber to reduce $CO_2$ pickup while at the same time maintaining sufficient residence time of the fluid stream with the aqueous absorbent composition to absorb a maximum amount of the $H_2S$ gas. Fluid streams with low partial pressures, such as those encountered in thermal conversion processes, will require less of the aqueous alkanolamine solution under the same absorption conditions than fluid streams with higher partial pressures such as shale oil retort gases.

A typical procedure for the $H_2S$ removal phase of the process comprises absorbing $H_2S$ via countercurrent contact of a gaseous mixture containing $H_2S$ and $CO_2$ with the aqueous alkanolamine solution of the amino compound in a column containing a plurality of trays at a temperature, of at least 50° F., and at a gas velocity of at least 0.3 feet per second (ft/sec, based on "active" or aerated tray surface), depending on the operating pressure of the gas, said tray column having fewer than 20 contacting trays, with, e.g., 4 to 16 trays being typically employed.

After contacting the fluid stream with the aqueous alkanolamine solution, which becomes saturated or partially saturated with $H_2S$, the solution may be at least partially regenerated so that it may be recycled back to the absorber. As with absorption, the regeneration may take place in a single liquid phase. Regeneration or desorption of the acid gases from the aqueous alkanolamine solution may be accomplished by conventional means of heating, expansion, stripping with an inert fluid, or combinations thereof, for example pressure reduction of the solution or increase of temperature to a point at which the absorbed $H_2S$ flashes off, or by passing the solution into a vessel of similar construction to that used in the absorption step, at the upper portion of the vessel, and passing an inert gas such as air or nitrogen or preferably steam upwardly through the vessel. The temperature of the solution during the regeneration step should be in the range from 120° F. to 350° F., and preferably from 180° F. to 260° F., and the pressure of the solution on regeneration should range from 0.5 psi to 100 psi, preferably 1 psi to 50 psi. The aqueous alkanolamine solution, after being cleansed of at least a portion of the $H_2S$ gas, may be recycled back to the absorbing vessel. Makeup absorbent may be added as needed.

In a preferred regeneration technique, the $H_2S$-rich aqueous alkanolamine solution is sent to the regenerator wherein the absorbed components are stripped by the steam which is generated by boiling the solution. Pressure in the flash drum and stripper is usually 0.5 psi to 50 psi, preferably 1 psi to 30 psi, and the temperature is typically in the range from 120° F. to 350° F., preferably 180° F. to 260° F. Stripper and flash temperatures will, of course, depend on stripper pressure. Heating of the solution to be regenerated may very suitably be affected by means of indirect heating with low-pressure steam. It is also possible, however, to use direct injection of steam. The resulting hydrogen sulfide-lean aqueous alkanolamine solution may be used to contact a gaseous mixture containing $H_2S$.

FIG. 1 represents an example of a gas treating process. An aqueous amine absorbent solution is introduced via feed line 5 into the upper portion of a gas-liquid countercurrent packed-bed absorption column 2. The gas stream is introduced through feed line 1 into the lower portion of column 2 at a gas flow rate of 10 liter per minute. The absorber pressure is adjusted to 238 psia. The clean gas (i.e., reduced amounts of $H_2S$ and $CO_2$) is discharged at the top of the absorber 2 through line 3 levels of acid gases are determined by gas chromatography (GC) analysis. The aqueous amine solution loaded with $H_2S$ and $CO_2$ flows toward the lower portion of the absorber, and leaves via line 4. The aqueous amine in line 4 is reduced in pressure by the level control valve 8 and flows through line 7 to heat exchanger 9, which heats the loaded aqueous solution. The hot rich solution enters the upper portion of the regenerator 12 via line 10. The regenerator 12 is equipped with random packing which effects desorption of the $H_2S$ and $CO_2$ gases. The pressure of the regenerator is set at 17 psia. The gases are passed through line 13 into condenser 14 wherein cooling and condensation of any residual water and amine occurs. The gases enter a separator 15 wherein the condensed liquid is separated from the vapor phase. The condensed aqueous solution is pumped via pump 22 through line 16 to the upper portion of the regenerator 12. The gases remaining from the condensation are removed through line 17 for final collection and/or disposal. The regenerated aqueous solution flows down through the regenerator 12 and the close-coupled reboiler 18. The reboiler 18, equipped with an electrical heating device, vaporizes a portion of the aqueous solution to drive off any residual gases. The vapors rise from the reboiler and are returned to the regenerator 12 which commingle with falling liquid and then exit through line 13 for entry into the condensation stage of the process. The regenerated aqueous solution from the reboiler 18 leaves through line 19 and is cooled in heat exchanger 20, and then is pumped via pump 21 back into absorber 2 through feed line 5.

Preferably, solutions of the invention are introduced into a gas treating process via line 4, 5, 10, 13, 16 and/or 19.

Preferably the clean gas contains equal to or less than 10 ppm $H_2S$, meeting some environmental regulations, more preferably equal to or less than 4 ppm $H_2S$, meeting typical pipeline specifications.

A preferred embodiment of the invention involves performing the method of the invention continuously, or as a continuous process. However, the method may be performed batch wise or semi-continuously. Selection of the type of process used should be determined by the conditions, equipment used, type and amount of gaseous stream, and other factors apparent to one of ordinary skill in the art based on the disclosure herein.

Working Examples

The following Examples provide a non-limiting illustration of various aspects of the Invention.

In a 250 mL glass beaker, 30 g of methyldiethanolamine (MDEA, 30 wt %, Fw=119 g·mol$^{-1}$, 252 mmol), 1.5 g of methylaminoethanol (MAE, 1.5 wt %, Fw=75 g·morl$^{-1}$, 20 mmol), 1.5 g of diethanolamine (DEA, 1.5 wt %, Fw=105 g·morl$^{-1}$, 14 mmol), 67 g of water and 40 mmol of the tested methylated quaternary ammonium salt are added. The solution is homogenized and 70 mL is transferred to a 75 mL stainless steel sample bomb. The solution is degassed by bubbling pure nitrogen for 10 minutes using a long canula. The sample bomb is sealed and placed in an oven at 120° C. for 20 days.

Gas chromatography analysis of the solution is performed before and after aging in the oven.

A. 2-hydroxy-N-(2-hydroxyethyl)-N,N-dimethyl-ethanaminium bromide (Me-MDEA)

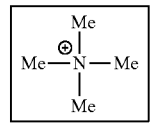

| Amines | DMEA | MAE | MDEA | DEA |
|---|---|---|---|---|
| concentration before aging (in wt %) | 0.07 | 1.25 | 28.27 | 1.40 |
| concentration after aging (in wt %) | 0.72 | 0.52 | 29.58 | 0.93 |

B. 2,3-dihydroxy-N,N,N-trimethylpropan-1-aminium chloride (Me-DMAPD)

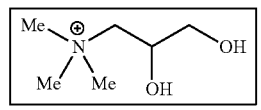

| Amines | DMEA | MAE | DMAPD | MDEA | DEA |
|---|---|---|---|---|---|
| concentration before aging (in wt %) | 0.00 | 1.31 | 2.19 | 26.29 | 1.36 |
| concentration after aging (in wt %) | 0.56 | 0.53 | 3.30 | 25.89 | 0.85 |

C. 2-hydroxy-N,N-bis(2-hydroxyethyl)-N-methyl-ethanaminium bromide (Me-TEA)

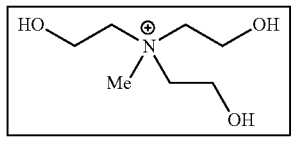 [SMILES: C[N+](CCO)(CCO)CCO]

| Amines | DMEA | MAE | MDEA | DEA | TEA |
|---|---|---|---|---|---|
| concentration before aging (in wt %) | 0.00 | 1.21 | 27.75 | 1.29 | 2.10 |
| concentration after aging (in wt %) | 0.48 | 0.40 | 27.07 | 0.99 | 4.58 |

D. tetramethylammonium hydroxide (Me-TMA)

| Amines | DMEA | MAE | MDEA | DEA |
|---|---|---|---|---|
| concentration before aging (in wt %) | 0.01 | 1.27 | 25.87 | 0.43 |
| concentration after aging (in wt %) | 0.61 | 0.72 | 25.80 | 0.43 |

E. Results and Conclusions

| | Methylated Quaternary Ammonium Salt | | | |
|---|---|---|---|---|
| | Me-MDEA | Me-DMAPD | Me-TEA | Me-TMA |
| % Reduction of MAE | 58 | 60 | 67 | 43 |
| % Reduction of DEA | 34 | 37 | 23 | 0 |
| Total % Reduction | 45 | 48 | 44 | 32 |

Figure 2:
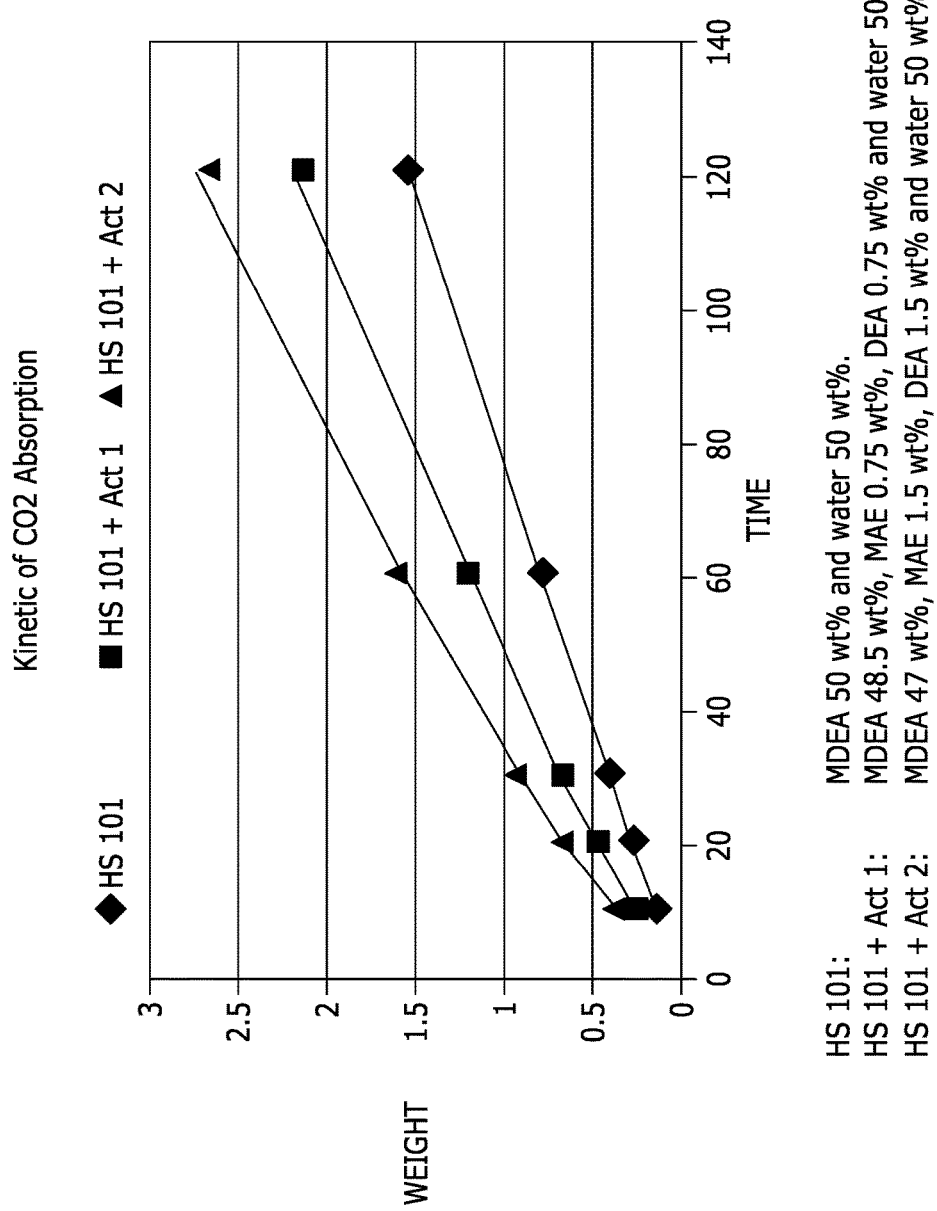
FIG. 2 is a graphical depiction of $CO_2$ absorption over time for three solutions with different activators.

As can be seen in FIG. 2, in order to validate the reduction of $CO_2$ absorption kinetic at lower activator concentration, a pure $CO_2$ stream (Flow rate of 100 mL per minute) at ambient pressure and temperature has been bubble using a canula through three solutions (50 mL) containing different amount of activator. The increase in weight, which corresponds to the amount of $CO_2$ absorbed, has been recorded at regular interval of time.

Although the present invention has been described by reference to its preferred embodiment as is disclosed in the specification and drawings above, many more embodiments of the present invention are possible without departing from the invention. Thus, the scope of the invention should be limited only by the impended claims.

The claimed invention is:

1. A method of treating oil and gas streams comprising $H_2S$, and a carbon oxide, said method comprising the step of:
    treating said gas stream with an amine solution comprising a first tertiary alkanolamine and a methylated quaternary ammonium salt;
    wherein said methylated quaternary ammonium salt reacts with a primary or secondary alkanolamine present in said oil and gas streams, producing a second tertiary alkanolamine; and wherein said second tertiary alkanolamine and said amine solution selectively remove said $H_2S$ over said carbon oxide.

2. The method of claim 1, wherein said amine solution comprises from about 0.1 wt % to about 99 wt % said methylated quaternary ammonium salt.

3. The method of claim 2, wherein said amine solution comprises from about 0.1 wt % to about 5 wt % said methylated quaternary ammonium salt; and
    wherein said amine solution comprises from about 15 wt % to about 99 wt % said first tertiary alkanolamine.

4. The method of claim 3, wherein said first tertiary alkanolamine is selected from the group consisting of methyldiethanolamine (MDEA), triethanolamine (TEA), dimethylethanolamine (DMEA), diethylethanolamine (DEEA), 3-dimethylaminopropane-1,2-diol (DMAPD), 3-diethylaminopropane-1,2-diol (DEAPD), 2-dimethylaminopropane-1,3-diol, 2-diethylaminopropane-1,3-diol, 2-(hydroxyethyl)-2-dimethylaminopropane-1,3-diol (DMTA), 2-(hydroxyethyl)-2-diethylaminopropane-1,3-diol (DETA), tert-butoxyaminoethoxyethanol (TBAEE) and mixtures thereof.

5. The method of claim 1, wherein said methylated quaternary ammonium salt is added to said amine solution during treatment of said oil and gas stream.

6. The method of claim 5, wherein said amine solution comprises from about 0.5 wt % to 99 wt % said quaternary ammonium salt; and
    wherein said amine solution comprises from about 0.01 wt % to about 60 wt % said first tertiary alkanolamine.

7. The method of claim 6, wherein said first tertiary alkanolamine is selected from the group consisting of methyldiethanolamine (MDEA), triethanolamine (TEA), dimethylethanolamine (DMEA), diethylethanolamine (DEEA), 3-dimethylaminopropane-1,2-diol (DMAPD), 3-diethylaminopropane-1,2-diol (DEAPD), 2-dimethylaminopropane-1,3-diol, 2-diethylaminopropane-1,3-diol, 2-(hydroxyethyl)-2-dimethylaminopropane-1,3-diol (DMTA), 2-(hydroxyethyl)-2-diethylaminopropane-1,3-diol (DETA), tert-butoxyaminoethoxyethanol (TBAEE) and mixtures thereof.

8. The method of claim 4 or 7, wherein said amine solution additionally comprises an adjuvant selected from the group consisting of a corrosion inhibitor, an antifoaming agent and a stripping aids or mixtures thereof.

9. The method of claim 1, wherein said methylated quaternary ammonium salt is selected from the group consisting of 2-hydroxy-N-(2-hydroxyethyl)-N,N-dimethylethanaminium bromide; 2-hydroxy-N-(2-hydroxyethyl)-N,N-dimethylethanaminium chloride; 2-hydroxy-N-(2-hydroxyethyl)-N,N-dimethylethanaminium iodide; 2-hydroxy-N-(2-hydroxyethyl)-N,N-dimethylethanaminium bicarbonate; 2-hydroxy-N-(2-hydroxyethyl)-N,N-dimethylethanaminium carbonate; 2-hydroxy-N-(2-hydroxyethyl)-N,N-dimethylethanaminium sulfate; 2-hydroxy-N-(2-hydroxyethyl)-N,N-dimethylethanaminium phosphate; 2,3-dihydroxy-N,N,N-trimethylpropan-1-aminium chloride; 2,3-dihydroxy-N,N,N-trimethylpropan-1-aminium bromide; 2,3-dihydroxy-N,N,N-trimethylpropan-1-aminium iodide; 2,3-dihydroxy-N,N,N-trimethylpropan-1-aminium bicarbonate; 2,3-dihydroxy-N,N,N-trimethylpropan-1-aminium carbonate; 2,3-dihydroxy-N,N,N-trim thylpropan-1-aminium sulfate; 2,3-dihydroxy-N,N,N-trimethylpropan-1-aminium phosphate; 2-hydroxy-N,N-bis(2-hydroxyethyl)-N-methy ethanaminium bromide; 2-hydroxy-N,N-bis(2-hydroxyethyl)-N-methy ethanaminium chloride; 2-hydroxy-N,N-bis(2-hydroxyethyl)-N-methy ethanaminium iodide; 2-hydroxy-N,N-bis(2-hydroxyethyl)-N-methy ethanaminium bicarbonate; 2-hydroxy-N,N-bis(2-hydroxyethyl)-N-methy ethanaminium carbonate; 2-hydroxy-N,N-bis(2-hydroxyethyl)-N-methy ethanaminium sulfate; 2-hydroxy-N,N-bis(2-hydroxyethyl)-N-methy ethanaminium phosphate; tetramethyl ammonium bromide; tetramethyl ammonium chloride; tetramethyl ammonium iodide; tetramethyl ammonium bicarbonate; tetramethyl ammonium carbonate; tetramethyl ammonium sulfate; tetramethyl ammonium phosphate; and mixtures thereof.

* * * * *